Apr. 3, 1923.  1,450,744

T. F. KELLEY

PLATE HOLDING AND GUIDING APPARATUS

Filed July 31, 1919  2 sheets-sheet 1

WITNESS:
Gustav Genzlinger.

INVENTOR
Thomas Franklin Kelley
BY Cyrus N. Anderson
ATTORNEY

Apr. 3, 1923.

T. F. KELLEY 1,450,744

PLATE HOLDING AND GUIDING APPARATUS

Filed July 31, 1919   2 sheets-sheet 2

WITNESS:
Gustav Genzlinger.

INVENTOR
Thomas Franklin Kelley
BY
Cyrus N. Anderson
ATTORNEY

Patented Apr. 3, 1923.

1,450,744

UNITED STATES PATENT OFFICE.

THOMAS FRANKLIN KELLEY, OF GLOUCESTER, NEW JERSEY.

PLATE HOLDING AND GUIDING APPARATUS.

Application filed July 31, 1919. Serial No. 314,545.

*To all whom it may concern:*

Be it known that I, THOMAS FRANKLIN KELLEY, a citizen of the United States, and a resident of Gloucester, in the county of Camden and State of New Jersey, have invented an Improvement in Plate Holding and Guiding Apparatus, of which the following is a specification.

In the use of rotary machines for shearing plates or the like, it is now customary to guide the said plates to the rotary shearing disks by hand. Such manual guiding is expensive because it requires from four to six men to hold and guide the plates to and through the shearing machine in approximately the required relation to the shearing disks; but a still greater objection is the inability, manually, to positively hold and guide the plates being sheared or cut in proper and accurate relation to the shearing disks to effect the shearing thereof along the lines marked out.

It is the object of my invention to provide an apparatus for positively holding and guiding plates accurately in required relation to the shearing disks of a rotary shearing machine so as to effect a shearing or cutting of the same with accuracy along the line marked out.

A further object of my invention is to provide an apparatus which is adapted to hold one part of a plate and to co-operate with a rotary shearing machine to effect the shearing or cutting of said plate along a predetermined line.

A further object is to produce an apparatus of the character indicated which is simple in construction and efficient in operation and which may be cheaply and economically manufactured.

Other objects and advantages of my invention will be pointed out in the detailed description thereof which follows or will be apparent from such description.

In order that my invention may be readily understood and its practical advantages appreciated, reference may be had to the accompanying drawings in which I have illustrated one convenient form of embodiment of the same. However, it will be understood that my invention is susceptible of embodiment in other forms of construction than that shown and that changes in the details of construction may be made within the scope of the claims without departing from the same.

Figure 1:
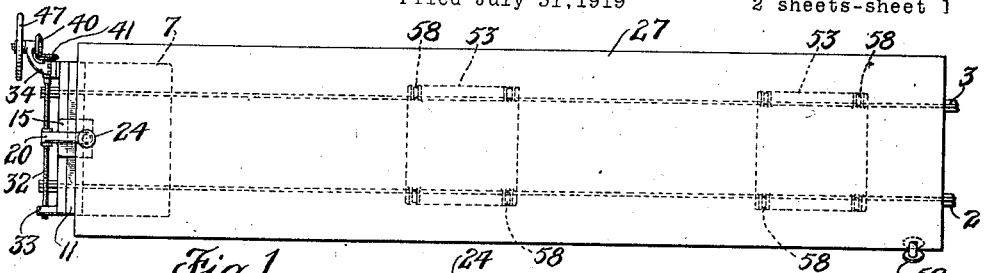
Fig. 1 is a top plan of a machine or apparatus embodying my invention and also showing shearing disks of a rotary shearing machine.
Figure 2:
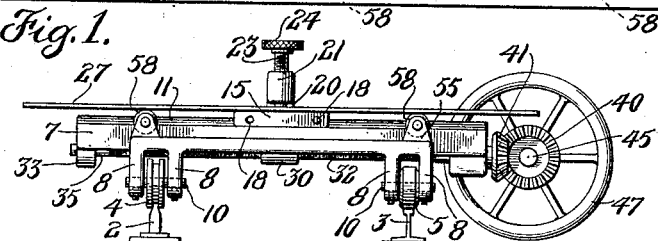
Fig. 2 is an end elevation looking toward the left in Fig. 1.

Referring to the drawings: 1 designates suitable supports for the rails 2 and 3 which constitute tracks for the wheels 4 and 5 of the plate holding device and the plate supporting trucks. The tracks are of such lengths as may be desired, depending upon the maximum length of plates to be sheared. Referring to the plate holding device, 7 designates a plate member which may be cast, or otherwise formed and which is provided with four pairs of depending projections or lugs 8 upon its under side at its four corners. The lower end portions of these projections or lugs are provided with holes, the holes of each couple being in opposed relation to each other for the reception of shafts 10 upon which are mounted the revoluble wheels 4 and 5. The former wheels are grooved, as indicated, and engage the tapered upper portion of the rail 2. The peripheries of the other wheels 5 are flat and rest upon the top of the rail 3.

The upper side of the member 7 near its front edge is provided with a raised undercut portion 11 which constitutes a guide upon which the plate holding and adjusting and guiding device is adjusted transversely of the said member 7. The said device comprises a flat plate-like member 15 having in its lower side an undercut groove 16 for the reception of the undercut guide projection 11. To provide for the wear of the undercut surfaces I employ a gib 17 which fits in between two opposing surfaces of the raised undercut guiding portion 11 and the groove 16. The said gib is tightened and held in place by means of clamping or holding screw bolts 18. The member 15 is also provided with a projecting bracket like portion 20 which is integrally or otherwise connected therewith. The said projecting portion 20 is provided with a part 21 which extends rearwardly over and in spaced relation to the member 15 and is provided with a screw-threaded opening 22 for a screw-threaded plate holding post 23. The latter is turned for adjustment by means of the knurled wheel 24. The lower end of the post 23 is provided with a tapered portion 25 which is adapted to pass through a hole 26 in a plate 27 and enter a hole in the member 15. The plate 27 may turn or pivot about the portion 25. The bracket 20 is also provided with a projection 30 which extends forwardly and downwardly and which is provided with a screw-threaded opening 31 which is in engagement with a screw-threaded rod 32 revolubly supported at its opposite ends in bearings formed in the projections 33 and 34 which extend forwardly from the opposite end portions of the front edge of the member 7. Only the portion of the rod 32 between the points $a$ and $b$ is screw-threaded, leaving the smooth surfaces 35 onto which the depending projection 30 may pass when the plate holding device has been adjusted in either direction to the limit of its movement by the rotation of the said rod. But for the presence of these smooth surfaces the rotation of the rod 32 would cause the projection to jam against the projections 33 and 34 and might break or fracture them.

Rotation of the rod 32 is effected by means of a bevel gear 40 which engages a bevel gear 41 upon an end of the shaft 32 adjacent the projection 34. The bevel gear 41 is situated outside of the said projection 34. The bevel gear 40 is mounted upon the rear end of a shaft 45 journaled in a bearing 46 formed in the forwardly and laterally extended end of the projection 34. Rotation of the shaft 45 and gear 40 is effected by means of a hand wheel 47 upon the outer end of said shaft. By rotating the wheel 47 in either direction the screw threaded rod 32 may be rotated in either direction to cause adjustment of the plate holding device comprising the part 15 and associated parts in either direction to adjust the plate 27 in either direction.

To prevent longitudinal displacement of the rod 32 I have provided a collar 48 thereon adjacent the inner side of the projection 34. The gear 41 being secured to the said rod adjacent the outer side of said projection, it is apparent that the rod will be held against longitudinal displacement in the operation of the apparatus.

A portion of the rotating shearing machine situated at the outer rear end of the plate 27 is shown in Fig. 1, comprising a shearing disk 50.

Figure 3:
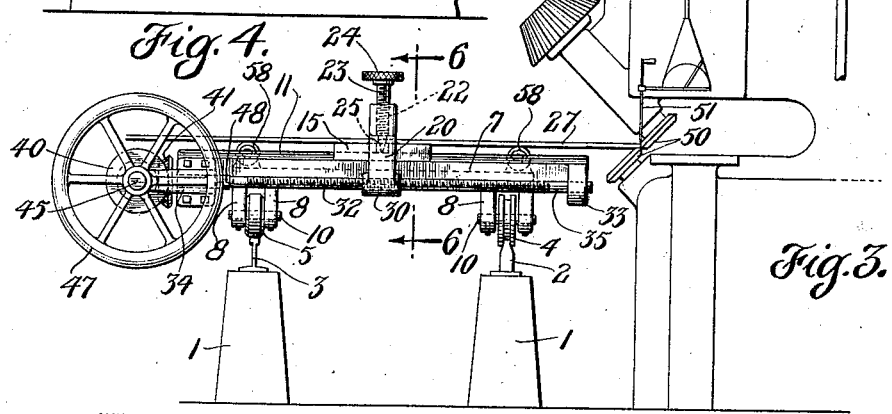
Fig. 3 is an end elevation looking toward the right in Fig. 1 and showing in the distance the outline of a rotary shearing machine.
Figure 5:
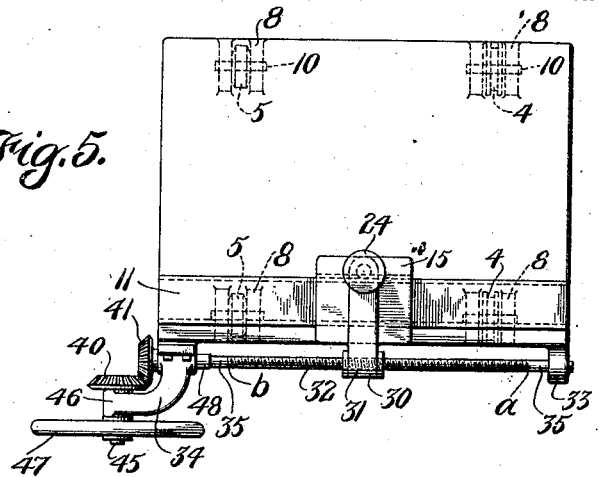
Fig. 5 is a top plan view of the part of the apparatus shown in Figs. 3 and 4 and at the left end of Fig. 1.
Figure 6:
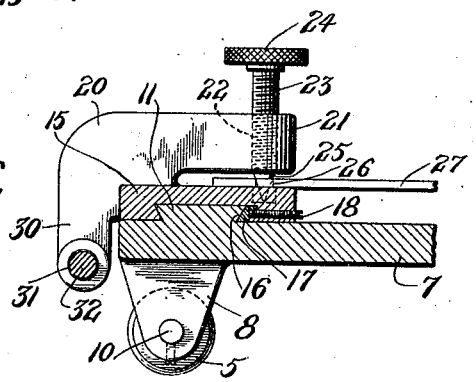
Fig. 6 is a transverse sectional view taken on the line 6—6 of Fig. 3.
Figure 7:
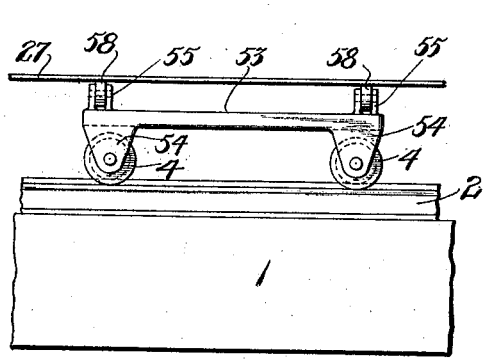
Fig. 7 is a view in side elevation of a plate supporting truck and of a portion of the track support for the same.
Figure 8:
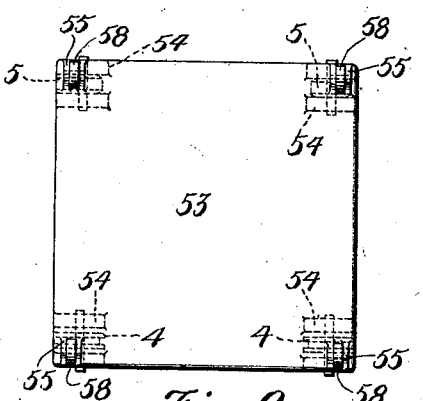
Fig. 8 is a top plan view of the said truck.

In Fig. 3 I have shown the general outline of a rotary shearing machine comprising a pointer 51 and a dial having a hand 52. The pointer and hand are operatively connected in known manner, the shearing machine outlined and referred to being already in the market and well known.

To support the plate in rear of the plate holding device, I have provided trucks comprising platforms 53 having depending projections 54 arranged in couples as shown, the said respective couples supporting shafts or rods upon which the wheels 4 and 5 are revolubly supported. The tops of said platforms are also provided with projections 55 arranged in couples at the four corners thereof as shown. Each of these couples supports a roller or revoluble wheel 58 upon which rollers the plate being sheared rests. These rollers are arranged with their planes extending transversely of the respective platforms 53 and with the plate being sheared. Therefore they are free to rotate in whichever direction the said plate may be adjusted by the adjustment of the plate holding device as previously described; but as the plate and the plate holding device and the support for the latter are drawn along rearwardly by the shearing disks during the shearing operation the friction between said rollers 58 and the plate is sufficient to cause the said trucks to move along on the tracks (comprising the rails 2 and 3) provided therefor.

Figure 4:
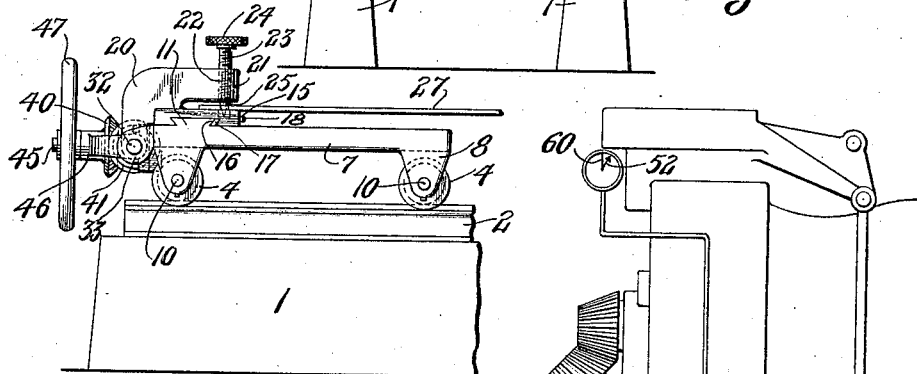
Fig. 4 is a view in side elevation of the plate holding and guiding part of the apparatus looking toward the left in Fig. 3 and also showing a portion of the foundation support and track for supporting said part.

In operation the plate to be sheared is placed in position with its front end secured to the adjustable plate-holding device. The rear end of said plate is then engaged by the rotary shearing disks of the rotary shearing machine. The line along which the plate is to be sheared or cut either has been already marked out or should be marked out. An operator then takes the pointer 51 in his hand and guides the point thereof along the line marked out and along which the plate is to be sheared. With the pointer held upon this line, if the shearing disks happen to deviate to one side or the other from the said line, such deviation is indicated by the deviation of the hand 52 in one direction or the other from the black line 60 upon the dial. If the deviation of the shearing disks is toward the right, having reference to Fig. 4 of the drawing, the deviation of the hand 52 will be toward the right; or if the deviation of the shearing disks from the said line should be toward the left, having reference to said figure, the hand 52 would deviate toward the left, such deviation indicating a corresponding deviation of the shearing disks with respect to the said line. The amount of angular deviation of the hand 52 is proportional to the amount of deviation of the shearing disks from the line along which the pointer 51 is being guided.

An operator at the front end of the apparatus watches the dial having the hand 52 and upon observation of a deviation of the latter immediately turns the adjusting wheel 47 to rotate the rod 32 and cause adjustment in the proper direction of the plate holding device to which the front end portion of the plate being sheared is connected, to adjust the plate in the proper direction with respect to the shearing disks to cause the latter to operate along the line marked out.

By the employment of my invention it will be seen that only two operatives are necessary to conduct and guide the plate to and through the shearing machine in proper relation to the shearing disks, the operator for holding the pointer 51 and the operator for operating and controlling the wheel 47 by the operation of which the plate which is being sheared may be adjusted into proper relation with respect to the shearing disks.

While I have illustrated and described my invention for use in connection with a rotary shearing machine in which the plates to be sheared are drawn or fed along by the shearing disks thereof, I desire it to be understood that it is not limited to a machine of this particular character, or a machine for shearing plates, but may be employed in connection with other machines of analogous nature in which a plate or equivalent member is to be held and guided with relation to some part of a machine which is operating thereon for some purpose, and in which the plate may, by any suitable means, be moved or fed along to the devices operating thereon.

I claim:

1. A work holding and guiding device comprising a movable member provided with a guide and having projections extending from the front edge thereof, a work holding device upon said member, said device being guided upon and by the said guide, and said device having a projection extending forwardly therefrom intermediate the projections upon the said member, said projection being provided with a screw threaded opening, a screw threaded rod revolubly supported in bearings in the projections upon the said member and extending through the screw threaded opening in the projection upon the said device, and means for causing rotation of said rod in either direction to effect adjustments of the said work holding device in either direction upon the said member.

2. In an apparatus of the character described, the combination of a shearing machine provided with shearing means, means for supporting a plate to be sheared in operative relation to the said shearing means, the said supporting means being adapted to travel forwardly toward and past the said machine to present the said plate to the said shearing means, a holding device supported upon and carried by a part of the said supporting means, said holding device being adapted to pivotally engage and positively hold the said plate adjacent an end thereof in front of the said shearing means, and means also carried and supported by the said part for effecting adjustments of said holding device in either direction simultaneously with and during the forward movement thereof to cause angular adjustments of the said plate about the shearing point of said shearing means as a center.

In testimony that I claim the foregoing as my invention, I have hereunto signed my name this 28th day of July A. D., 1919.

THOMAS FRANKLIN KELLEY.